C. W. MIZELL & M. G. HALL.
HAY BALING PRESS.
APPLICATION FILED APR. 18, 1916.
1,235,044.
Patented July 31, 1917.
2 SHEETS—SHEET 1.
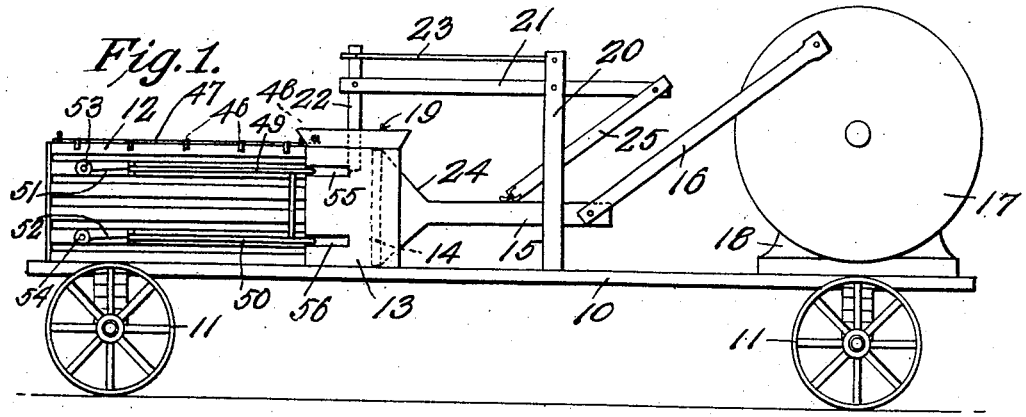
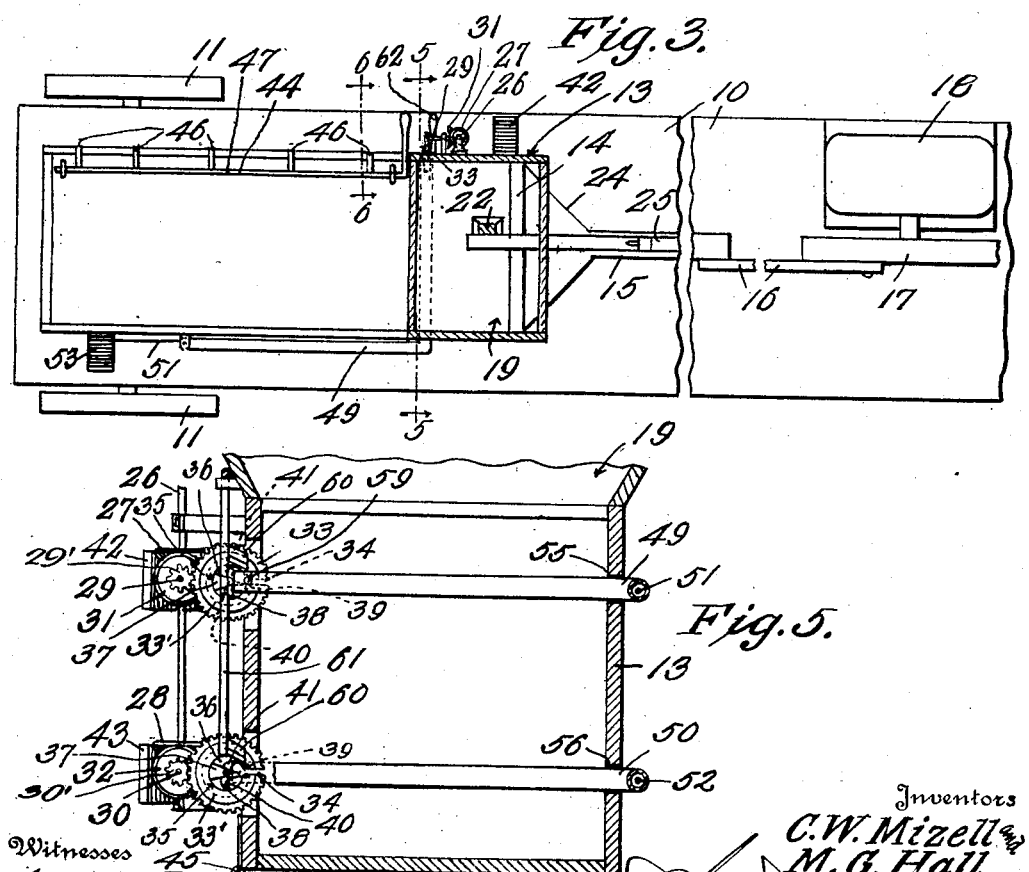

C. W. MIZELL & M. G. HALL.
HAY BALING PRESS.
APPLICATION FILED APR. 18, 1916.
1,235,044.
Patented July 31, 1917.
2 SHEETS—SHEET 2.
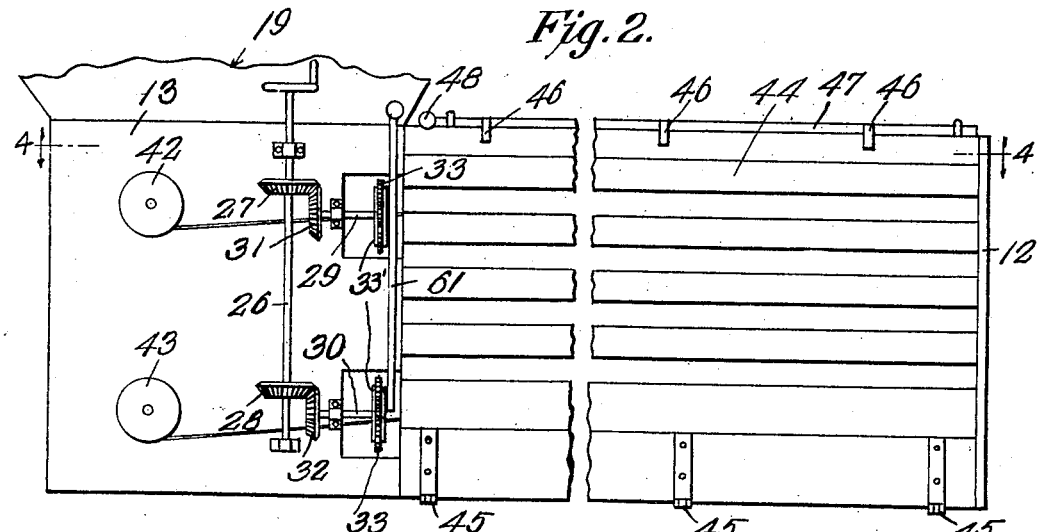
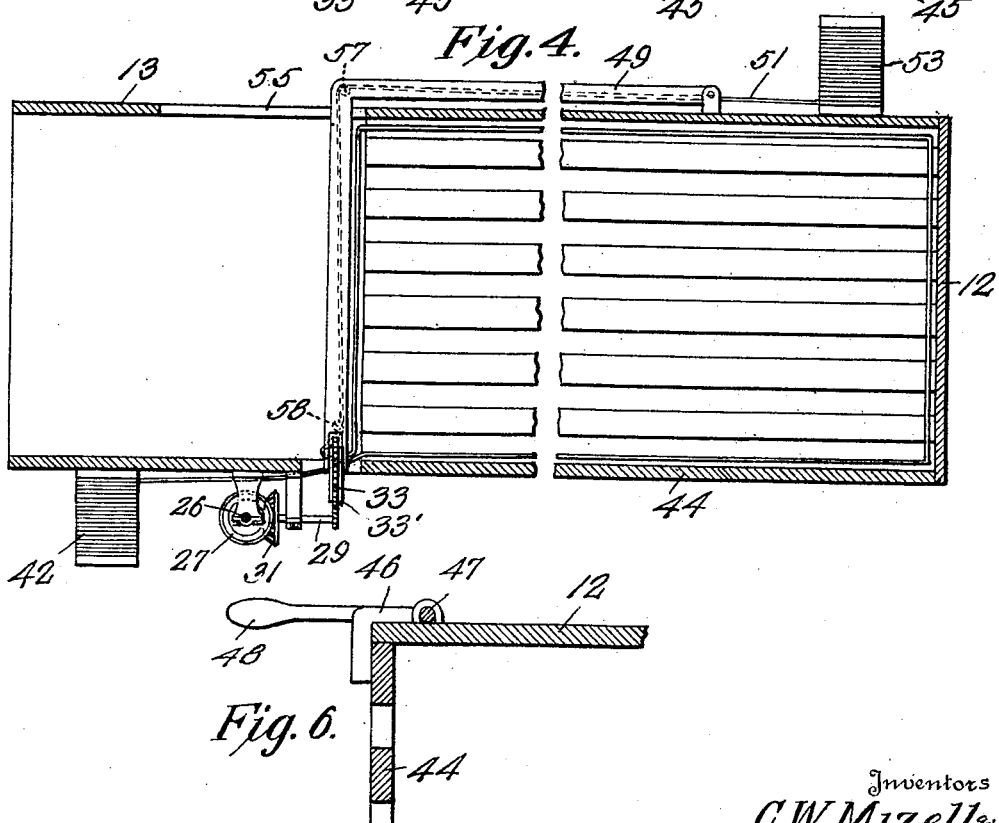
Witnesses
James F. Crown
H. M. Test
Inventors
C. W. Mizell
M. G. Hall,
By
Attorneys

UNITED STATES PATENT OFFICE.

CHARLES W. MIZELL AND MILES G. HALL, OF HEAVENER, OKLAHOMA.

HAY-BALING PRESS.

1,235,044.  Specification of Letters Patent.  Patented July 31, 1917.

Application filed April 18, 1916. Serial No. 92,003.

*To all whom it may concern:*

Be it known that we, CHARLES W. MIZELL and MILES G. HALL, citizens of the United States, residing at Heavener, in the county of Le Flore, State of Oklahoma, have invented certain new and useful Improvements in Hay-Baling Presses; and we do hereby declare the following to be a full, clear, and exact description of the invention, such as will enable others skilled in the art to which it appertains to make and use the same.

This invention relates to improvements in presses, and particularly to hay baling presses.

One object of the invention is to provide a hay baling press which is readily movable over a field within convenient reach of windrows which can be readily thrown into the compressing chamber.

Another object is to provide a device of this character which is equipped with a novel and simple mechanism for securing the tie wires around the bales.

Other objects and advantages will be apparent from the following description when taken in connection with the accompanying drawing.

In the drawing:

Figure 1 is a side elevation of our improved baling press;

Fig. 2 is a view taken from the opposite side, showing the baling and tying mechanism;

Fig. 3 is a top plan view;

Fig. 4 is a longitudinal sectional view on the line 4—4 of Fig. 2;

Fig. 5 is a transverse section on the line 5—5 of Fig. 3; and

Fig. 6 is a transverse section on the line 6—6 of Fig. 3.

Referring particularly to the accompanying drawing, 10 represents the bed of the machine which is supported by the ground engaging wheels 11. On one end of the bed is mounted the baling box or chamber 12 at one end of which is formed the compressing chamber 13 and in which is reciprocably mounted the plunger head 14. This plunger head is provided with a rod 15, connected with a driving pitman 16 of the wheel 17 of the engine 18. This latter is mounted on the other end of the bed. A suitable hopper mouth 19 is formed in the upper side of the compressing chamber to receive the hay as it is thrown thereinto. Mounted between the engine and the compressing chamber is a vertical frame 20 on which is pivotally mounted a horizontally disposed lever 21, the forward end of which is pivotally connected to the vertically reciprocating feeding plunger 22. Pivotally connected to the upper end of the plunger 22 and the frame 20 is a rod 23 which causes the positive vertical reciprocation of the said plunger. The rear of the plunger head 14 has an inclined face 24 which is adapted to engage with an arm 25 rigidly secured to the rear end of the arm 21 when the said plunger head is withdrawn from the compressing chamber. This arm 25 is rigidly secured to the arm 21 whereby a rocking movement of the latter arm is accomplished when the former engages with the inclined face 24, the result being the downward movement of the plunger 22 against the hay in the compressing chamber.

At one side of the compressing chamber is mounted a vertical shaft 26 on which, and adjacent respectively the upper and lower ends thereof are mounted the beveled pinions 27 and 28. Adjacent the shaft 26 are two horizontally disposed shafts 29 and 30, the former of which is provided with a beveled pinion 31, meshing with the pinion 27, while the latter is provided with a beveled pinion 32, meshing with the pinion 28. Mounted on the other end of the shaft 29 is a pinion 29' and on the corresponding end of the shaft 30 is a similar pinion 30'. The former of these pinions meshes with a peripherally toothed disk 33, while the latter meshes with a similar disk 33'. Each of these disks 33 and 33' is formed in one side with a radially extending slot 34, the purpose of which will appear later. These disks are mounted to rotate in casings 33'', each casing being formed with a radially extending slot adapted to register with the slot of the disk. In the center of each of the casings is formed a transverse opening 35 which alines with an opening 36 formed in the center of the disk. A finger 37 extends into the opening of the disk from one of the walls thereof and has pivotally attached thereto a substantially T-shaped member 38. The leg of this member is tapered to a point which is adapted to swing across the slot of the disk and rest alternatively in notches 39 formed in the walls of the inner end of the slot. The cross arms of the T are curved as shown at 40 and 41 for a purpose which will later appear.

Mounted on the side of the compressing chamber directly in rear of each of the pinions 27 and 28 are the spools of wire 42 and 43. The adjacent side 44 of the baling chamber is hinged at its lower edge as at 45 while the upper edge is retained in closed position by a plurality of hooks 46 carried by a longitudinally extending shaft 47, which shaft is provided at one end with a lever 48 for accomplishing the rocking of said shaft to release the hooks.

On the opposite side of the baling chamber there are pivotally mounted the upper and lower L-shaped arms which act as needles. These arms or needles are hollow throughout and receive therethrough wires 51 and 52 carried respectively to the spools 53 and 54. In the adjacent side of the compression chamber there are formed slots 55 and 56, through which these needles are adapted to swing.

In the angle of each of the needles is arranged a pulley 57, and a similar pulley 58 is disposed in the outer end of the needle and at each side. In the end of each needle is formed a transverse slot opening through the end of the needle and adapted to straddle one of the casings 33'. An opening 59 is also formed in the end of each of the needles to permit the end of the wire to be drawn therefrom.

As the hay is forced into the baling chamber by the plunger 14, the wires are drawn around the bale in the following manner; the ends of the wires 51 and 52 which project from the ends of the needles 49 and 50 are first drawn across the mouth of the baling chamber and twisted or tied to the respective ends of the wires of the spools 42 and 43. The needles remain in outwardly extending positions, at this time. These wires will thus be stretched across the mouth of the baling chamber so that when the hay is pushed into the chamber it will push the wires ahead of it toward the opposite end of the chamber, the wires readily unreeling from the spools. When the bale is completed, the needles are swung through the slots and across the mouth of the baling chamber so that the portions of the wires which extend from the pulleys 58 to the openings 59 at the inner ends of the needles will be placed into the slots of the casings 33' and disks 33. The wires from the spools 42 and 43 will be drawn through the other slots of the disks by the forward movement of the hay into the baling chamber, and then by rotating the shaft 26 by means of a crank 26' on the upper end thereof, the disks will be rotated to twist the wires on both sides of the disks, one twist being at the adjacent corner of the bale.

When the wires are first twisted together in beginning operations, said wires will be passed through the slots of the casings and disk, and into the central openings of the disks. The engagement of the wires with one of the cross arms of the T-shaped member will rock the member so as to dispose its pointed end in the opposite notch of the slot. The before-mentioned portions of the wires at the ends of the needles, when said needles are moved across the compressing chamber will enter the slot and pass into the central opening at the opposite side of the leg of the T. Thus a wire will be disposed at each side of the leg and of the finger which supports the T.

Mounted to slide vertically across the inner faces of the disks 33 are the knives 60, the same being carried by a vertical rod 61 which is pivotally connected at its upper end to a pivoted lever 62 mounted on the compressing chamber. These knives will coöperate with the walls of the slots of the disks 33 and sever the wires. The wires from the spools 42 and 43 will remain twisted with the wires from the spools 53 and 54 and then upon releasing the hooks 46 the completed bale will be ejected through the side of the chamber. The needles are then withdrawn so as to stretch the wires across the mouth of the baling chamber in position to be again engaged by the hay for a new bale.

What is claimed is:

1. A hay baling press and tying device therefor, comprising a baling chamber, a compressing chamber, hollow L-shaped needles pivotally mounted at one end to one side of the baling chamber and movable transversely between the baling and compressing chambers, the free ends of the said needles being bifurcated transversely, and slotted twisting elements rotatably mounted adjacent one corner of the baling chamber and arranged to be straddled by the bifurcations of the needles.

2. A hay baling and tying device comprising a baling chamber and a compressing chamber, means for passing wires transversely between the chambers to be subsequently pushed into the baling chamber by the forming bale, rotatable elements mounted at one corner of the baling chamber and having a radial slot in the periphery thereof positioned to receive the adjacent end portions of the said wires, an oscillating guiding member mounted in the center of each of the slotted elements and adapted to move to dispose the separate strands of wire on opposite sides thereof, means for rotating the said notched elements to accomplish a twisting on opposite sides of the said elements, and vertically movable knives arranged to be moved across one face of each of the said slotted elements to sever the wires, whereby the wires around the bale will be twisted at the corner, and the wires at the opposite side of the notched elements will remain in twisted relation to form a continuous wire.

In testimony whereof, we affix our signatures, in the presence of two witnesses.

CHARLES W. MIZELL.
MILES G. HALL.

Witnesses:
T. A. FOREHAND,
L. C. GEAR.